Figure 1:
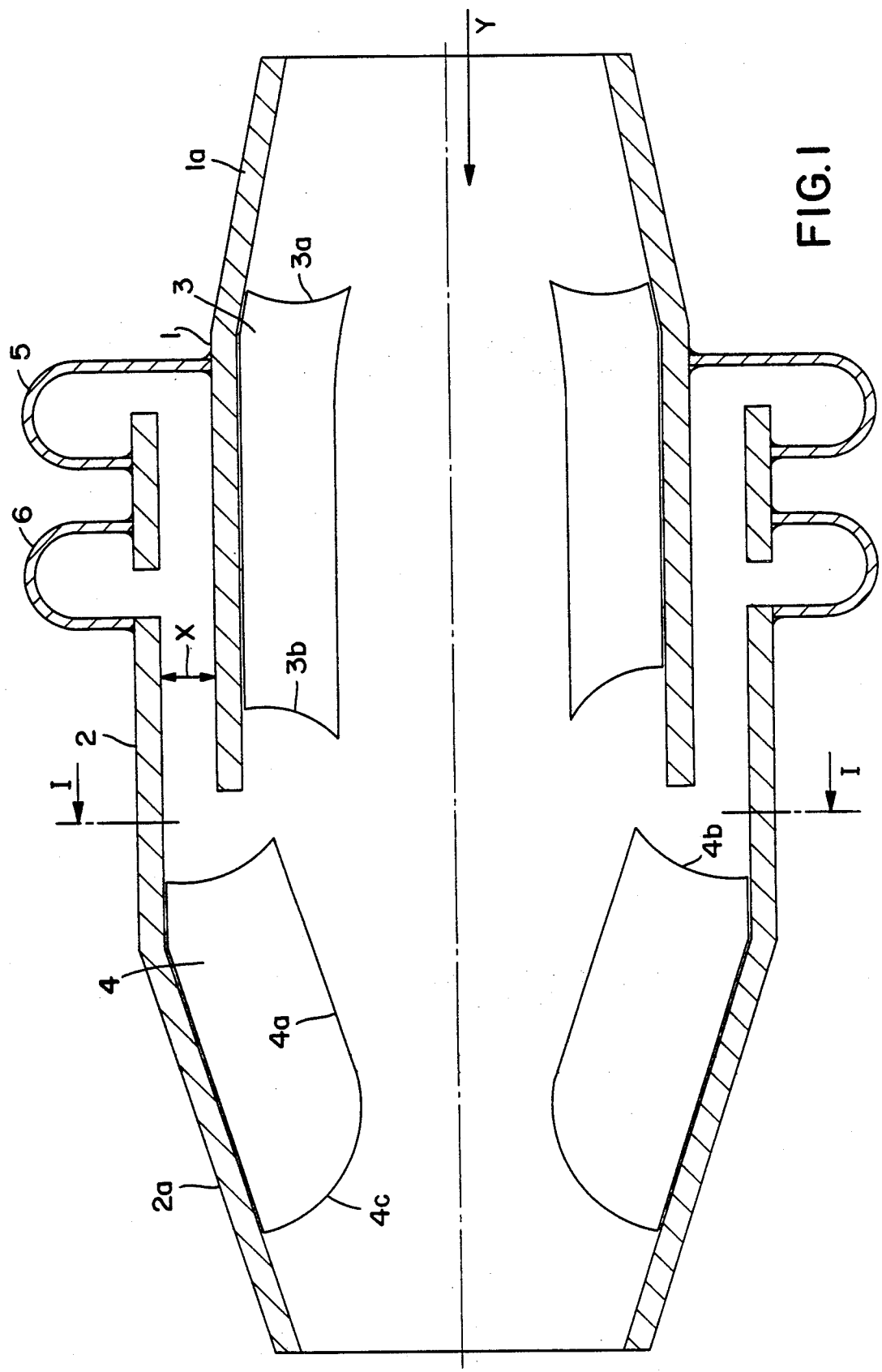

United States Patent [19]

Schulze

[11] Patent Number: 4,993,887
[45] Date of Patent: Feb. 19, 1991

[54] COMPENSATOR FOR SOLIDS CONVEYED IN A STREAM OF GAS

[76] Inventor: Erwin Schulze, Kirchgasse 10, D-3500 Kassel-Bettenhausen, Fed. Rep. of Germany

[21] Appl. No.: 376,397

[22] Filed: Jul. 6, 1989

[30] Foreign Application Priority Data

Jul. 7, 1988 [DE] Fed. Rep. of Germany ....... 3823046

[51] Int. Cl.⁵ ............................................. B65G 53/52
[52] U.S. Cl. .................................... 406/193; 406/191; 138/36; 138/139
[58] Field of Search ................. 406/193, 195, 191, 92, 406/46; 138/137, 139, 36; 366/336, 337, 338, 340; 285/16, 17, 45; 417/548

[56] References Cited

FOREIGN PATENT DOCUMENTS 1109352  8/1984  U.S.S.R. ................................ 406/92

Primary Examiner—Joseph F. Peters, Jr.
Assistant Examiner—Anne E. Bidwell
Attorney, Agent, or Firm—Collard, Roe & Galgano

[57] ABSTRACT

There is provided a compensator for solids conveyed in a stream, particularly for installation in a power plant, which consists of two sleeves which are telescopically arranged so as to be inserted into each other and having fins arranged on the inner walls of the sleeves so that the conveyed solids do not or rarely come in contact with the walls of the compensator.

8 Claims, 2 Drawing Sheets

COMPENSATOR FOR SOLIDS CONVEYED IN A STREAM OF GAS

The present invention relates to a compensator for solids conveyed in a stream of gas, particularly for installation in a power plant, consisting of two sleeves which are telescopically arranged so that one is inserted into the other and which are laterally displaceable at a radial distance to each other.

Compensators of the type with which the present invention is concerned are adapted to compensate for the distances between individual machine units which vary as a result of thermal effects and, specifically, both in the axial and vertical direction. A compensator of this type is disclosed in German patent documents DE-OS No. 35 26 481 and DE-GM 82 11 555. The compensator design according to DE-GM No. 82 11 555 only provides for compensation of axial expansion, while the compensator design known from DE-OS No. 35 26 481 also provides for displacement in a direction transverse to the longitudinal axis of the compensator. A compensator disclosed in German patent document DE-GM 74 04 687, because of its design as a siphon, also provides for angular displacements.

It is typical of compensators that they are subject to great wear and tear if they are used to convey solids such as ash, for example.

The object of the present invention is to provide a compensator as described above for the converying of solids wherein the wear and tear resulting from conveying solids such as ash is significantly reduced.

The above object is accomplished according to the present invention by arranging fins on the inner walls of the sleeves of the compensator. In the configuration of a compensator, each of the sleeves exhibit a tapered extension for connection to machine units. By arranging fins on the inner walls of the compensator, a flow is achieved wherein the materials flowing therethrough no longer or rarely come in contact with the walls of the compensator, thereby reducing wear and tear to a minimum.

This flow is maintained even if both sleeves of the compensator are angled toward each other, that is, whenever the compensator compensates for deflections in a vertical direction.

The configuration of a compensator is such that the sleeve on the flow intake side is concentrically telescoped or inserted into the sleeve on the flow outlet side, having therefore a smaller diameter than that of the sleeve on the flow outlet side. The fins mounted in the sleeve on the flow intake side are respectively concavely shaped at their terminus and extend up and into the tapered extension of the compensator. The leading end of each fin in this configuration, follows the shape of the tapered extension.

The fins mounted in the sleeve in the flow outlet side are concave in shape at the terminus on the flow intake side and convex in shape at the terminus on the flow outlet side. The forward ends of the fins mounted in the sleeve on the flow outlet side follows a straight line in the longitudinal direction.

Other objects and features of the present invention will become apparent from the following detailed description considered in connection with the accompanying drawings. It is to be understood, however, that the drawings are designed as an illustration only and not as a definition of the limits of the invention.

Figure 2:
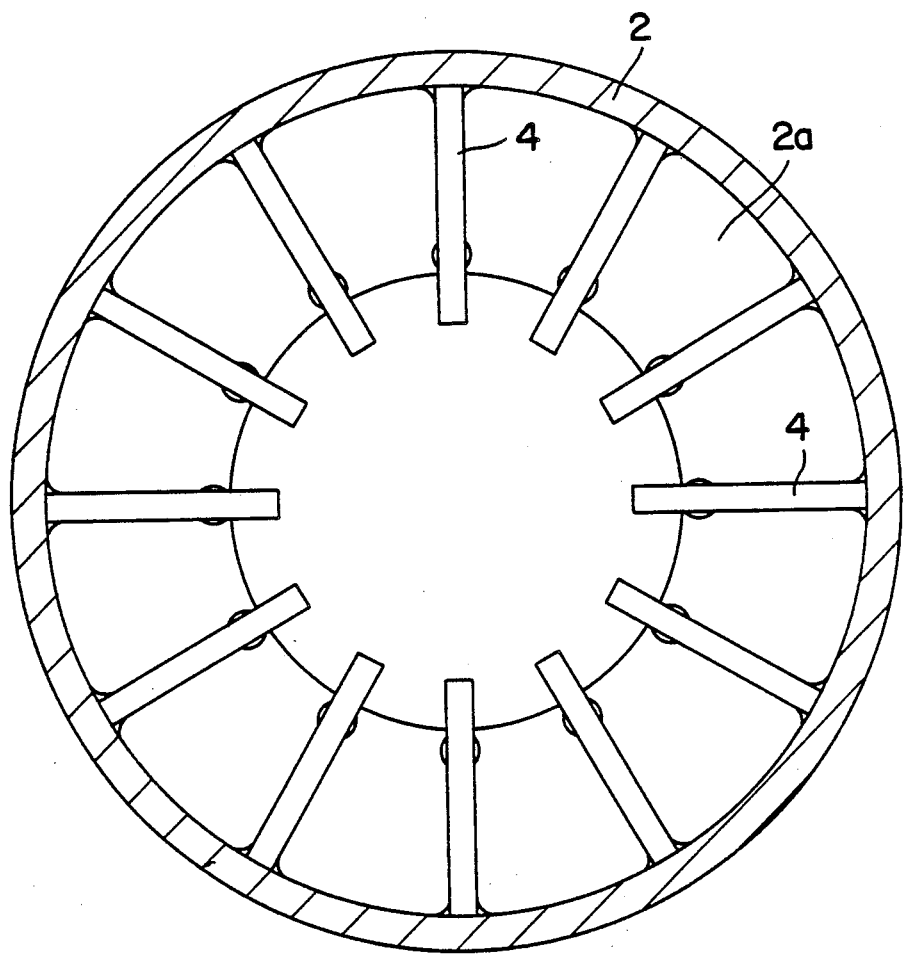

In the drawings, wherein similar reference character denotes similar elements throughout the several views:

FIG. 1 is a lateral cross-sectional view of a compensator according to the present invention; and FIG. 2 is a cross-sectional view of the compensator of FIG. 1 taken along the line 1—1 of FIG. 1.

Now turning to the drawings, the compensator of FIG. 1 consists of sleeves 1 and 2 which are telescopically inserted in one another at a radial distance X from one another, whereby each sleeve exhibits at its terminal side a tapered extension piece 1a and 2a, respectively. On the inner wall of sleeve 1 of the compensator, a series of twelve fins, designated 3, are arranged which are concavely shaped at their ends 3a and 3b. Fins 3 extend at their one terminus into tapered extension 1a sleeve 1. Because the fins, in the area of tapered extension 1a, follow the angle of the taper at 3c fin height over their entire length is uniform.

Sleeve 2 also exhibits, on its inner wall, a series of twelve fins, designated 4, whcih are concave in shape at the flow intake side 4b and convex at the flow outlet side 4c. Flow direction is designated by the arrow Y. Fins 4 are aligned with fins 3 mounted in sleeve 1 and are provided with a straight line edge 4a in the longitudinal direction which is unbroken at the tapered extension 2a, in contrast to fins 3.

Both sleeves 1 and 2 are telescopically arranged so that one is inserted with the other at a radial distance to each other and are longitudinally displaceable such that any required compensation both in the vertical or radial direction, as well as in the longitudinal direction, is possible. Compensation in the longitudinal direction is effected in this configuration by the two U-shaped, curved connecting pieces 5 and 6. Because of their slight gauge these connecting pieces 5 and 6 are able to bend and are therefore able to compensate for flucutations in the longitudinal direction.

While only a single embodiment of the present invention has been shown and described, it will be obvious that many changes and modifications may be made thereunto without departing from the spirit and scope of the invention.

I claim:

1. A compensator for solids conveyed in a gas stream, particularly for use in a power plant, comprising:
   a pair of sleeves, each of which has an inner wall, an inner end and an outer end, said inner ends of said sleeves being telescopically arranged relative to one another such that said sleeves are laterally displaceable at a radial distance to each other, one of said sleeves defining a flow inlet side of said compensator and the other of said sleeves defining a flow outlet side of said compensator; and
   a plurality of fins arranged on said inner walls of said sleeves.

2. The compensator according to claim 1, wherein said outer ends of said sleeves are tapered.

3. The compensator according to claim 2, wherein said fins arranged on said inner wall of said sleeve defining said flow inlet side extend into said tapered outer end thereof.

4. The compensator according to claim 2, 1, wherein said tapered outer ends of said sleeves define an angle of taper and wherein said fins arranged on said inner wall of said sleeve defining said flow outlet side have a rectilinear edge running generally parallel to said angle of taper.

5. The compensator according to claim 2, 1, wherein said tapered outer ends of said sleeves define an angle of taper and wherein said fins arranged on said inner wall of said sleeve defining said flow inlet side have a rectilinear edge running generally parallel to said angle of taper.

6. The compensator according to claim 1, wherein said sleeve defining said flow inlet side is concentrically inserted into said sleeve defining said flow outlet side.

7. The compensator according to claim 6, wherein said fins arranged on said inner wall of said sleeve defining said flow inlet side have concavely-shaped ends.

8. The compensator according to claim 1, wherein said fins arranged on said inner wall of said sleeve defining said flow outlet side have concavely shaped ends facing said flow inlet side and have convexly shaped ends facing said flow outlet side.

* * * * *